United States Patent
N

(10) Patent No.: US 12,413,621 B2
(45) Date of Patent: *Sep. 9, 2025

(54) VISUAL DETECTION OF PHISHING WEBSITES VIA HEADLESS BROWSER

(71) Applicant: McAfee, LLC, San Jose, CA (US)

(72) Inventor: Shashi KIran N, Bangalore (IN)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,734

(22) Filed: Apr. 29, 2024

(65) Prior Publication Data

US 2024/0283821 A1 Aug. 22, 2024

Related U.S. Application Data

(63) Continuation of application No. 17/882,460, filed on Aug. 5, 2022, now Pat. No. 12,069,091, which is a continuation of application No. 16/676,939, filed on Nov. 7, 2019, now Pat. No. 11,411,992.

(51) Int. Cl.
*H04L 9/40* (2022.01)
*G06F 16/955* (2019.01)
*G06N 20/00* (2019.01)

(52) U.S. Cl.
CPC ........ *H04L 63/1483* (2013.01); *G06F 16/955* (2019.01); *G06N 20/00* (2019.01); *H04L 63/1416* (2013.01); *H04L 63/1433* (2013.01); *H04L 63/166* (2013.01)

(58) Field of Classification Search
CPC . H04L 63/1483; H04L 63/166; G06F 16/955; G06N 20/00
See application file for complete search history.

(56) References Cited

U.S. PATENT DOCUMENTS

| | | | |
|---|---|---|---|
| 7,890,612 B2 | 2/2011 | Todd et al. | |
| 8,332,947 B1 * | 12/2012 | Bregman | H04L 63/1433 726/25 |
| 8,806,622 B2 | 8/2014 | Waterson et al. | |

(Continued)

FOREIGN PATENT DOCUMENTS

| | | |
|---|---|---|
| EP | 3599753 A1 | 1/2020 |
| KR | 1020080027035 A | 3/2008 |

(Continued)

OTHER PUBLICATIONS

Cordero, et al., "Catching Phish: Detecting Phishing Attacks from Rendered Website Images," Dec. 2006.

*Primary Examiner* — Hee K Song
(74) *Attorney, Agent, or Firm* — Patent Capital Group

(57) ABSTRACT

There is disclosed a computer-implemented system and method for protecting a user from phishing attacks, including detecting that the user has opened a website associated with a uniform resource locator (URL), and determining that the URL does not have a known good reputation; rendering a test version of the website in a headless web browser, including abstracting the website into at least one visual element of the test version; visually inspecting the test version of the website with a digital eye, and determining that the test version of the web looks like a known legitimate website not associated with the URL; and based on the visual inspection, warning the user that the website is or may be a phishing website.

20 Claims, 11 Drawing Sheets

(56) References Cited

U.S. PATENT DOCUMENTS

| | | | |
|---|---|---|---|
| 8,819,826 | B2 | 8/2014 | Sallam |
| 9,009,820 | B1 | 4/2015 | McDougal et al. |
| 9,516,055 | B1 | 12/2016 | Liu |
| 9,516,058 | B2 | 12/2016 | Antonakakis et al. |
| 9,621,566 | B2 | 4/2017 | Gupta et al. |
| 10,044,739 | B2 | 8/2018 | Muttik |
| 10,574,696 | B2 | 2/2020 | Celik |
| 10,581,883 | B1 | 3/2020 | Syme et al. |
| 10,834,128 | B1 * | 11/2020 | Rajagopalan ......... H04L 51/212 |
| 10,999,322 | B1 * | 5/2021 | Yuan ..................... G06F 16/583 |
| 11,003,775 | B2 | 5/2021 | Kraemer et al. |
| 11,146,576 | B1 * | 10/2021 | Mushtaq ............. H04L 63/1416 |
| 11,381,597 | B2 | 7/2022 | Lancioni et al. |
| 2006/0253578 | A1 * | 11/2006 | Dixon ..................... G06F 21/44 709/225 |
| 2006/0253580 | A1 * | 11/2006 | Dixon ................. H04L 63/0227 709/225 |
| 2007/0118528 | A1 | 5/2007 | Choi et al. |
| 2007/0245422 | A1 | 10/2007 | Hwang et al. |
| 2007/0283000 | A1 * | 12/2007 | Proux ................. H04L 63/1416 709/224 |
| 2007/0294352 | A1 | 12/2007 | Shraim et al. |
| 2008/0133540 | A1 | 6/2008 | Hubbard et al. |
| 2010/0100958 | A1 | 4/2010 | Jeremiah |
| 2010/0332593 | A1 | 12/2010 | Barash et al. |
| 2012/0158626 | A1 | 6/2012 | Zhu et al. |
| 2013/0074185 | A1 | 3/2013 | McDougal et al. |
| 2013/0227636 | A1 | 8/2013 | Bettini et al. |
| 2014/0359760 | A1 | 12/2014 | Gupta et al. |
| 2017/0155665 | A1 * | 6/2017 | Dufour ................. G06F 21/566 |
| 2017/0195363 | A1 | 7/2017 | Dahan et al. |
| 2018/0027013 | A1 | 1/2018 | Wright et al. |
| 2018/0054737 | A1 | 2/2018 | Guo et al. |
| 2018/0191778 | A1 | 7/2018 | Volkov |
| 2019/0014149 | A1 | 1/2019 | Cleveland et al. |
| 2019/0068638 | A1 | 2/2019 | Bartik et al. |
| 2019/0327267 | A1 * | 10/2019 | Onut ....................... H04L 67/02 |
| 2020/0036751 | A1 | 1/2020 | Kohavi |
| 2020/0252428 | A1 | 8/2020 | Gardezi et al. |
| 2021/0014269 | A1 * | 1/2021 | Devane ............... H04L 63/1483 |
| 2021/0021638 | A1 | 1/2021 | Lancioni et al. |
| 2021/0037006 | A1 * | 2/2021 | Belenko ................ G06F 16/955 |
| 2021/0075826 | A1 * | 3/2021 | Johnson ................. H04L 67/02 |

FOREIGN PATENT DOCUMENTS

| | | |
|---|---|---|
| WO | 2016034935 A1 | 3/2016 |
| WO | 2021016142 | 1/2021 |

* cited by examiner

VISUAL DETECTION OF PHISHING WEBSITES VIA HEADLESS BROWSER

CROSS-REFERENCE TO RELATED APPLICATIONS

This application is a continuation (and claims the benefit of priority under 35 U.S.C. § 120) of U.S. application Ser. No. 17/882,460, filed Aug. 5, 2022, and entitled "Visual Detection of Phishing Websites Via Headless Browser," which is a continuation of U.S. application Ser. No. 16/676,939, filed Nov. 7, 2019 and entitled "Visual Detection of Phishing Websites Via Headless Browser." The disclosures of the prior applications are considered part of and are incorporated by reference in the disclosure of this Application.

FIELD OF THE SPECIFICATION

This application relates in general to computer security, and more particularly, though not exclusively, to providing a system and method for visual detection of phishing websites via headless browser.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
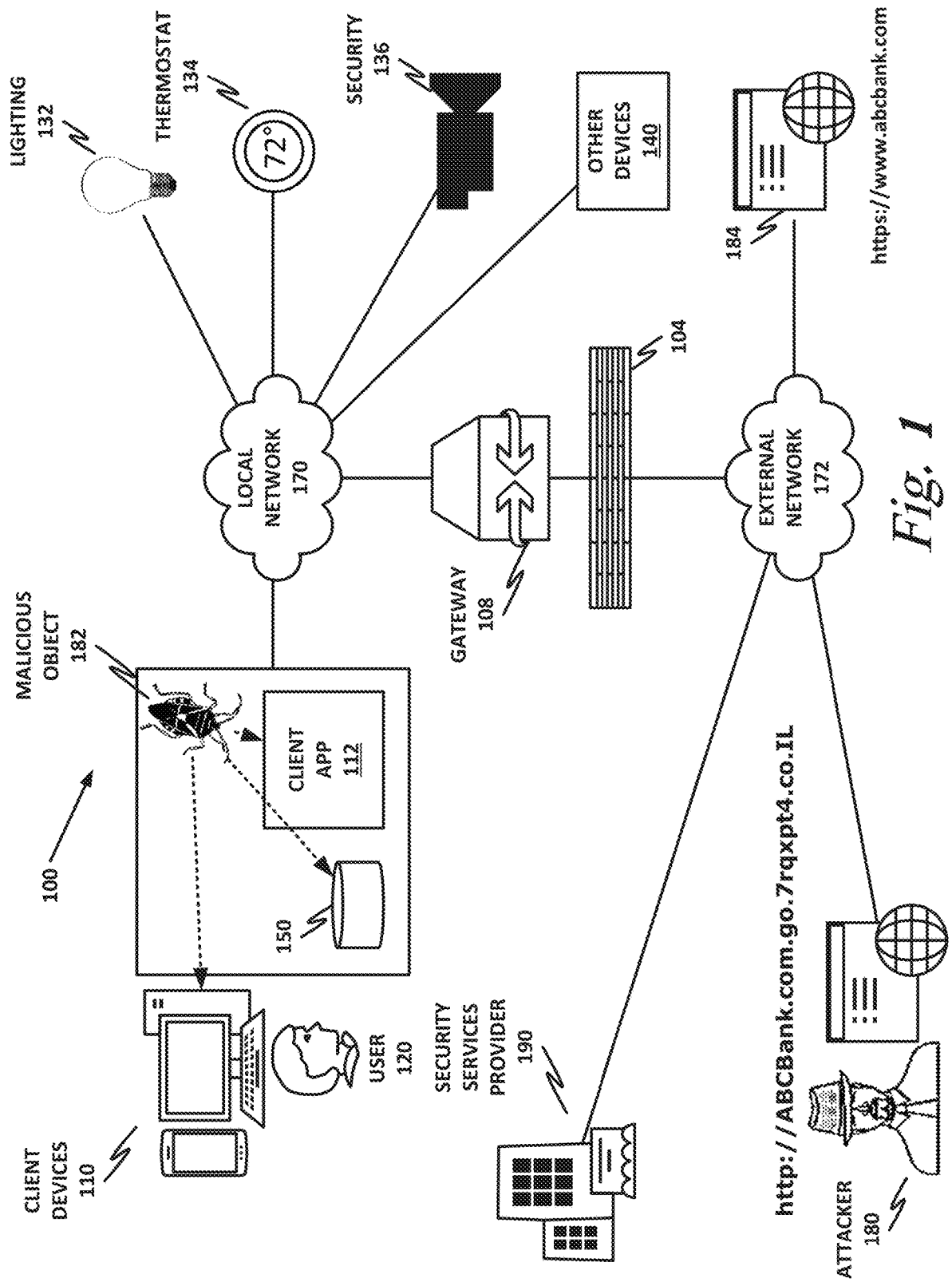
FIG. 1 is a block diagram of selected elements of a security ecosystem.

There is disclosed a computer-implemented system and method for protecting a user from phishing attacks, including detecting that the user has opened a website associated with a uniform resource locator (URL), and determining that the URL does not have a known good reputation; rendering a test version of the website in a headless web browser, including abstracting the website into at least one visual element of the test version; visually inspecting the test version of the website with a digital eye, and determining that the test version of the web looks like a known legitimate website not associated with the URL; and based on the visual inspection, warning the user that the website is or may be a phishing website.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Phishing is an important threat to both enterprise and home computer users. Phishing is the use of targeted e-mails and/or webpages that try to induce users into providing personal information, such as usernames, passwords, credit card data, Social Security number, tax information, or other sensitive data. In an illustrative phishing attack, the attacker sends out a mass e-mail blast to a large number of e-mail addresses. While traditional e-mail spam is merely annoying, phishing e-mails are more dangerous. The phishing e-mail may use logos, fonts, backgrounds, and other visual elements selected from popular websites and services. This creates a very sophisticated visual decoy that superficially appears to originate from the actual service. For example, a user may receive an unsolicited e-mail that appears to be from Netflix. The e-mail may "warn" the user that his Netflix account has a problem, and he needs to log back in and correct his credit card information to resume service.

If the user clicks on the link in the e-mail, he is directed to a phishing website. The phishing website may closely mimic the Netflix login page, and when the user enters his Netflix credentials, the attacker has now collected a valid Netflix login. Even worse, the user is directed to a page that closely mimics the Netflix payment information page. This page indicates that the user's credit card has expired, or that there has been an issue, and requests that the user enter a valid credit card. When the user enters a credit card, the attacker now has a valid credit card number, password, and security code that can be used for identity theft. This identity theft can continue until the user discovers the problem and cancels the credit card.

Other attacks are targeted at accessing online banking credentials, Social Security numbers, and other sensitive data that can be used for identity theft, or for theft of financial services.

In the early days of the internet, phishing attacks were less sophisticated, and only the highly credulous were generally susceptible to them. However, as users became more savvy, phishing attacks became more sophisticated, and it can now be very difficult for even a skeptical user to detect phishing e-mails, or to separate phishing e-mails from non-phishing e-mails.

Computer security mechanisms have gotten to be good at identifying phishing e-mails and websites when they are encountered and scanned. But part of the evolution of phishing attacks is that domain names and URLs used for phishing are rapidly moving targets. In practice, the time to live for a phishing website may be on the order of approximately four hours before the URL is changed. In contrast, web crawlers provided by search engines such as Google may take on the order of two days to scan and categorize the large number of new websites (numbering in the millions or billions) that come online each day. Thus, in many cases, by the time a phishing website is identified, scanned, and categorized, it is already stale and has moved to a new URL.

Human users are, therefore, often tasked with being the first line of defense against phishing scams. However, human users are generally poor at identifying phishing websites. The visual similarity to a trusted website may create a false sense of security in the users. Furthermore, phishing websites often use deceptively similar URLs. For example, the correct, full, unqualified domain name of a legitimate website may be used as a subdomain to a phishing domain. Thus, when the user looks at the link address, he may see what appears to be the correct domain name of a trusted website, followed by a large string of alphanumeric characters that are visually difficult to distinguish from HTML GET code.

Furthermore, the phishing e-mails may be contextually credible. It is not inconceivable to the user that his credit card may have expired, or that there may have been some other problem with his Netflix account, bank account, or some other online service. Indeed, online services may in reality provide such e-mails as a courtesy service to their users when an actual issue of this type arises. Well-crafted phishing e-mails may, in fact, be based on and closely mimic such legitimate notifications, with the exception that they redirect the user to a phishing scam website, instead of to the online service's legitimate website.

Thus, human users often remain the weakest link in the current and evolving threat landscape. In particular, e-mail users are often the soft target of choice for cyber criminals.

Furthermore, phishing attacks remain one of the easiest and most preferable ways for cyber criminals to acquire sensitive data. While modern security infrastructure makes traditional "brute force" electronic attacks difficult for all but the most sophisticated attackers, social engineering attacks like phishing scams continue to be relatively simple and effective. Indeed, contemporary security data indicate that some 80 to 90 percent of cyber attacks include phishing attacks in at least part of the attack lifecycle.

The threat may be even more substantial for enterprises. One study shows that approximately 97% of people worldwide are unable to successfully identify a sophisticated phishing e-mail or website.

Thus, even with sophisticated technology infrastructure, enterprises and consumers are still vulnerable to well-targeted phishing attacks, unless and until a savvy user identifies the malicious URL and has it blocked.

While the visual similarity of phishing e-mails and websites is a key enabler for phishing attacks from the perspective of human users, that very visual similarity can be an Achilles' heel for computer analysis. And while human users have relative difficulty in identifying phishing websites and e-mails, computer analysis is relatively straightforward.

Therefore, one consideration is to subject a suspicious website to sophisticated computer analysis before human users even have a chance to act on it. As a practical matter, it may not be preferable to scan every single URL contained within an e-mail or visited by a user. To do so may make the browsing experience unacceptably slow to users, and inhibit legitimate uses and business operations. The use of intelligent filtering can help to minimize the number of URLs submitted to scanning. For example, in practice, on the order of 95 percent of URLs most users visit may have a known reputation, either a globally known reputation from a reputable security services provider, or at least a locally known, cached reputation for that user. In other words, it is relatively uncommon for a user to visit a website or URL for the first time.

Thus, a first level of filtering may comprise simply identifying the relatively small percentage of websites that do not already have a known reputation. However, in a large enterprise, even this relatively small percentage of websites can provide a substantial workload to enterprise security scanners.

Thus, additional filtering mechanisms may also be provided. For example, URLs may be filtered on contextual attributes that indicate relative likelihood of being suspicious. A first line of inquiry may be whether the website uses plain, unencrypted hypertext transfer protocol (HTTP), or HTTP Secure (HTTPS). While unencrypted HTTP was popular in the early days of the internet, in modern practice, the use of unencrypted HTTP may be considered per se suspicious, and may warrant additional analysis.

Furthermore, even if the website uses HTTPS, additional attributes may be examined. For example, if the website uses HTTPS with a self-signed transport layer security (TLS) certificate, this may be deemed suspicious. If it uses HTTPS with a certificate that does not match the domain name, this may also be deemed suspicious.

In another example, the URL may use HTTPS, and it may provide a valid certificate that matches the issuer, but there could be other attributes that are suspicious. For example, some web services provide "blog" or personal webpage subdomains that are hosted on a subdomain of the primary user's domain. Thus, a webpage may have a valid certificate that matches the issuer, but this may be because it is a hosted subdomain on a blog service. Thus, a listing may be maintained of known blog services that provide such subdomains, and any subdomain hosted by such a service may be blocked, or may be subject to additional scrutiny, as though it were a non-HTTPS domain.

Another contextual attribute may be whether the linked webpage includes input fields, and whether any of those input fields have associated labels such as "username," "password," "credit card number," "Social Security number," or other fields for entering sensitive or personal information. A webpage that includes such fields may be selected for further analysis.

One issue with this first level scanning is that phishing attackers and cyber criminals may deliberately obfuscate the source code for their webpages to hide the fact that they are providing such fields. Furthermore, where they use logos, backgrounds, colors, and/or fonts to visually mimic the appearance of reputable websites, they may also provide obfuscation so that it is difficult for traditional pattern matching scanners to identify the use of these elements.

However, "digital eye" and computer vision machine learning models are not so easily defeated. Indeed, as described above, in the context of computer vision, the very visual similarity that inspires trust in the human user is an Achilles' heel under the scrutiny of computer vision analysis. By nature, for a phishing attack to be successful, it may provide close visual similarity. Although code obfuscation may be beneficial against pattern matching scanners, visual obfuscation may need to be minimal. For example, the label on a password field may be obfuscated by using an image as the label instead of a text label. Thus, a pattern matching scanner that looks for a text field with a label similar to "password" may be defeated if a remote image is loaded, for example, from yet another third-party website. However, from a computer vision perspective, the label (however it is rendered) needs to appear to the end user to be a simple, unambiguous password label. Even a small degree of visual obfuscation may make the label appear "funny" to the end user, and may hint to the end user that something is "off" about the webpage. It is theoretically possible to create a password label that a human user can successfully decode as a password label, but that is indecipherable to a computer (indeed, this is the theory behind so-called completely automated public Turing tests to tell computers and humans apart, or CAPTCHAs). But such a visual puzzle is, as a practical matter, not useful to a phishing scammer, who is trying to give the human user as few visual clues as possible that something is wrong.

For a computer vision analysis to be as successful as possible-particularly in light of code obfuscation that may make pattern matching style analysis difficult—it is beneficial to render the webpage as nearly as possible as it may be displayed to the human user. To this end, a headless browser may be used within an enterprise gateway or e-mail scanner. The headless browser includes the libraries and rendering engines provided by a traditional interactive browser. But instead of displaying the webpage to a human user for interaction, the headless browser merely renders the webpage internally. This internal rendering can then be provided to a computer vision machine learning model that has been visually trained on a number of legitimate websites. For this visual training, preference and/or precedence may be given to websites that are common targets of phishing scams. This may include, for example, banks, e-commerce sites, video streaming services, electronic payment sites, other media services, and other popular paid services.

If a sophisticated phishing URL is sufficiently visually similar to, for example, the Amazon.com website to fool a human user, the computer vision system may "recognize" the website visually as the Amazon website. Once the computer vision system has visually identified the website as belonging to a certain service or provider, a scanning engine can then determine if, for example, the website is hosted on an HTTPS domain registered to and owned by that entity. If the website is visually identified as belonging to the service provider, but it is not registered to the service provider, then it can effectively be identified as malicious and can be blocked.

In some embodiments, the computer vision analysis may be aided and made faster by focusing on certain elements, particularly elements that are most likely to provide visual cues to the human user. This can include the use of fonts, logos, background colors, background patterns, and other such elements that help a user intuitively identify the source of the webpage. If the rendered webpage is abstracted into these elements, then the computer vision analysis can focus on those abstracted elements rather than looking at the entire webpage as a whole.

A system and method for providing visual detection of phishing websites via headless browser will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. Embodiments of security ecosystem 100 may be configured or adapted to provide visual detection of phishing websites via headless browser, as disclosed in the present specification.

In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

In some examples, attacker 180 may deliver malicious object 182 via e-mail, or by otherwise directing user 120 to the malicious website.

Gateway 108 may, in some embodiments, include mechanisms to protect client devices 110 from attacker 180. For example, gateway 108 may have a phishing website detection engine that is designed to check for elements similar to how a seasoned human user may verify a phishing website. This is beneficial, because not all users are experts in identifying phishing sites. Furthermore, cyber criminals may be very intelligent or sophisticated, and may be able to convince all but the most seasoned and experienced users to provide the requested details. The provision of a phishing website mitigation engine within gateway 108 can help to protect from this damage.

The phishing website mitigation engine of gateway 108 may use a headless browser to identify a phishing website that has not yet been encountered within the enterprise. Performance may be enhanced by relying on URL reputations as a first pass check for whether a website is already known. In some embodiments, the phishing website mitigation engine of gateway 108 may verify website attributes and provide a mapping of aspects, such as a company's logo, to a suspected website. This can provide very high accuracy in identifying a phishing website.

This approach realizes advantages, because targeted phishing attacks tend to be short-lived, with a time to live on the order of approximately four hours. This makes it difficult to mitigate such attacks via web crawlers, which take on the order of approximately two days to identify a new phishing website. By the time the website is identified, it may already be stale, and may have moved to a different URL.

This also realizes advantages over some existing web controllers that only block risky sites. While this may be a reasonable approach for some contexts—the fact that a site has never been encountered does not per se indicate that it is malicious—it does leave users vulnerable. In particular, these solutions do not provide real-time detection of phishing websites.

Enterprises may spend a great deal of money training employees, but even with training, the majority of users fail to identify actual attacks when they happen. This approach also realizes advantages over solutions that use regular expressions and pattern matching, or other machine learning methods that are error-prone in detecting phishing attacks.

The phishing website mitigation engine of the present specification detects advanced zero day phishing attacks. There is no need to depend on external sources or inputs to detect a phishing site. The customer can customize a scanning process by whitelisting certain URLs and blacklisting other URLs. Detection is provided in real-time, and the accuracy rate is very high compared to some other solutions. This can, therefore, achieve high performance and is relatively less false-positive prone than some existing solutions.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects may be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the Global Threat Intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

In this example, attacker 180 operates a phishing website at the URL http://abcbank.com.go.7rqxpt4.co.IL. User 120 is a customer of ABC Bank, and regularly uses client devices 110 to access website 184 which provides services for ABC Bank, namely at the URL https://www.abcbank.com.

To try to compromise personally identifying information (PII), account information, or other sensitive information from user 120, attacker 180 may design the false website to be visually very similar to the homepage, a login page, or other portion of legitimate website 184. Thus, attacker 180 may have as one goal to induce user 120 to visit http://abcbank.com.go.7rqxpt4.co.IL. For example, attacker 180 may provide the link in an e-mail, as a phishing advertisement, or by some other mechanism to try to get user 120 to click on the link. When user 120 sees the link, he may see "abcbank.com," gloss over the rest of the URL, and assume that this is a legitimate website. If user 120 is sufficiently credulous, he may attempt to log into the false website, and thus provide his username and password to attacker 180. Furthermore, he may be tricked into providing other useful information, such as an account number, a birthday, answers to security questions, or other sensitive information.

Security services operator 190 may operate a global repository or cache of URL reputations, and may have security servers that are very capable of identifying phishing websites and blocking them. However, this URL service may require millions or even billions of URL submissions every week. After the URLs have been filtered with basic mechanisms (e.g., known/unknown, duplicated, whitelisted, blacklisted, malformed, etc.), all of the URLs with unknown reputations may be treated with the same level of priority, according to some known techniques in the art. In other words, the URL queue is a first in/first out (FIFO) queue. Under this scenario, a legitimate URL could be processed in a matter of minutes, while a phishing URL submitted moments later could be processed hours later, depending on the service load. Thus, by the time security services provider 190 analyzes the URL http://abcbank.com.go.7rqxpt4.co.IL, the phishing site may have already moved to a new location, and the information may be stale. This is illustrated in FIG. 2.

Figure 2:
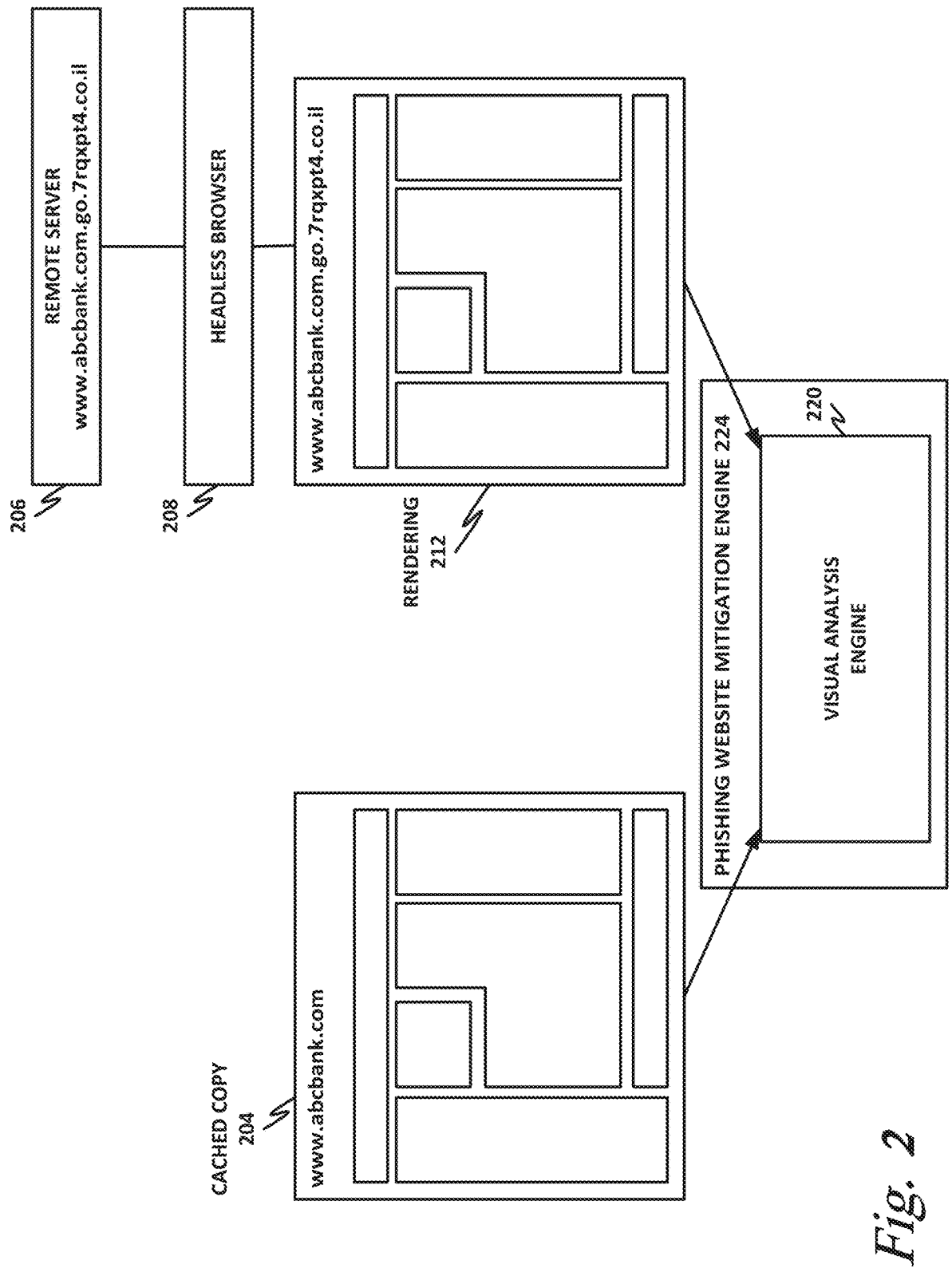
FIG. 2 is a block diagram illustrating mitigation of an example phishing attack.

FIG. 2 is a block diagram illustrating mitigation of an example phishing attack. In the embodiment of FIG. 2, a phishing website mitigation engine 224 includes a visual analysis engine 220. Visual analysis engine 220 may include a "digital eye" or a computer vision style artificial intelligence (AI) model. This model may be trained on a cached copy 204 of a particular website. In practice, visual analysis engine 220 may be trained on cached copies of a large number of websites that are likely to be targets of phishing attacks. This may include, for example, online banking services, digital entertainment services, e-commerce, e-payment, and other online services that require users to provide PII or other sensitive information.

To effectively deceive end users, the author of a phishing website may mimic as closely as possible the visual style of cached copy 204 of the actual website. This visual mimicry instills in the end user a sense of trust that they are accessing a legitimate website. To further instill this sense of trust, the attacker may use a deceptive URL. For example, if the attacker is mimicking www.abcbank.com, they may use a deceptive URL such as www.abcbank.com.go.7rqxpt4.co.IL. When human users see this address, they tend to focus on the portion of the URL that says "www.abcbank.com." The rest of the subdomain may be subconsciously dismissed as the type of HTTP GET code that commonly appears in URLs. This HTTP GET code may provide useful information to the web browser, but provides no meaningful information to a human user. Thus, human users naturally filter out this portion of the address. Because of this natural filtering, the user does not realize that this URL is actually hosted on the domain 7rqxpt4.co.IL. This domain is unlikely to be a legitimate domain owned and operated by ABC Bank, or its online banking subsidiary.

Knowing that the website may be subjected to analysis by a corporate gateway that uses pattern matching, the attacker may also take steps to obfuscate the code for the deceptive website.

Thus, remote server 206 serves a webpage at www.abcbank.com.go.7rqxpt4.co.IL. In its obfuscated source code form, this page may be as nearly meaningless to a pattern matching scanner as it is to a human user.

Thus, to render the served page in a usable form, visual analysis engine 220 includes a headless browser 208 that renders the webpage as though it were being observed by and interacting with a human user. This provides a rendering 212. Notably, rendering 212 is visually very similar to cached copy 204 of the legitimate webpage served by www.abcbank.com.

In some embodiments, elements of rendering 212 may be abstracted, such as logos, images, fonts, backgrounds, and color schemes. In other embodiments, rendering 212 is presented as a unitary image.

Visual analysis engine 220 of phishing website mitigation engine 224 observes rendering 212 to determine whether it can be identified as an example of a cached copy of a webpage 204.

Computer vision systems are quite effective at this kind of observation. For example, computer vision systems in recent years have been trained on images of humans, dogs, cats, fruits, or other objects. After being trained on a large data set of such images, a computer vision system is presented with a new image not in its training set. The task of the computer vision system is then to quickly classify the object. In other words, the computer vision system asks, "Is the image I am looking at a picture of a person?" (Or, in other cases, a picture of a dog, a cat, a fruit, a car, or some other object.) A well-trained computer vision model can determine with high accuracy whether the image it is "looking" at is, in fact, an example of the trained data set.

One advantage of the present approach is that rendering 212 may deliberately be designed to look very similar to cached copy 204 of a legitimate website. This visual identity, or near identity, is key to successfully deceiving the human user. If the website looks "funny" or "off," then the human user is unlikely to be deceived.

This means that one of the weaknesses of computer vision systems is of less concern in this approach. Although computer vision systems have become very good at identifying most objects belonging to a class, they are not perfect, and they are not as good as most real humans. This is the theory behind many "CAPTCHA" puzzles. If an object is obscured or distorted just the right amount, it is still recognizable to a human user (perhaps with some effort), but it is not recognizable to a computer vision system that has not been well-trained on such distorted images. However, a distorted rendering 212 would essentially be self-defeating. If rendering 212 is distorted from cached copy 204 sufficiently to defeat a digital eye looking at the images, it is unlikely to deceive a human user-particularly, a human user with even a modicum of training.

Figure 3:
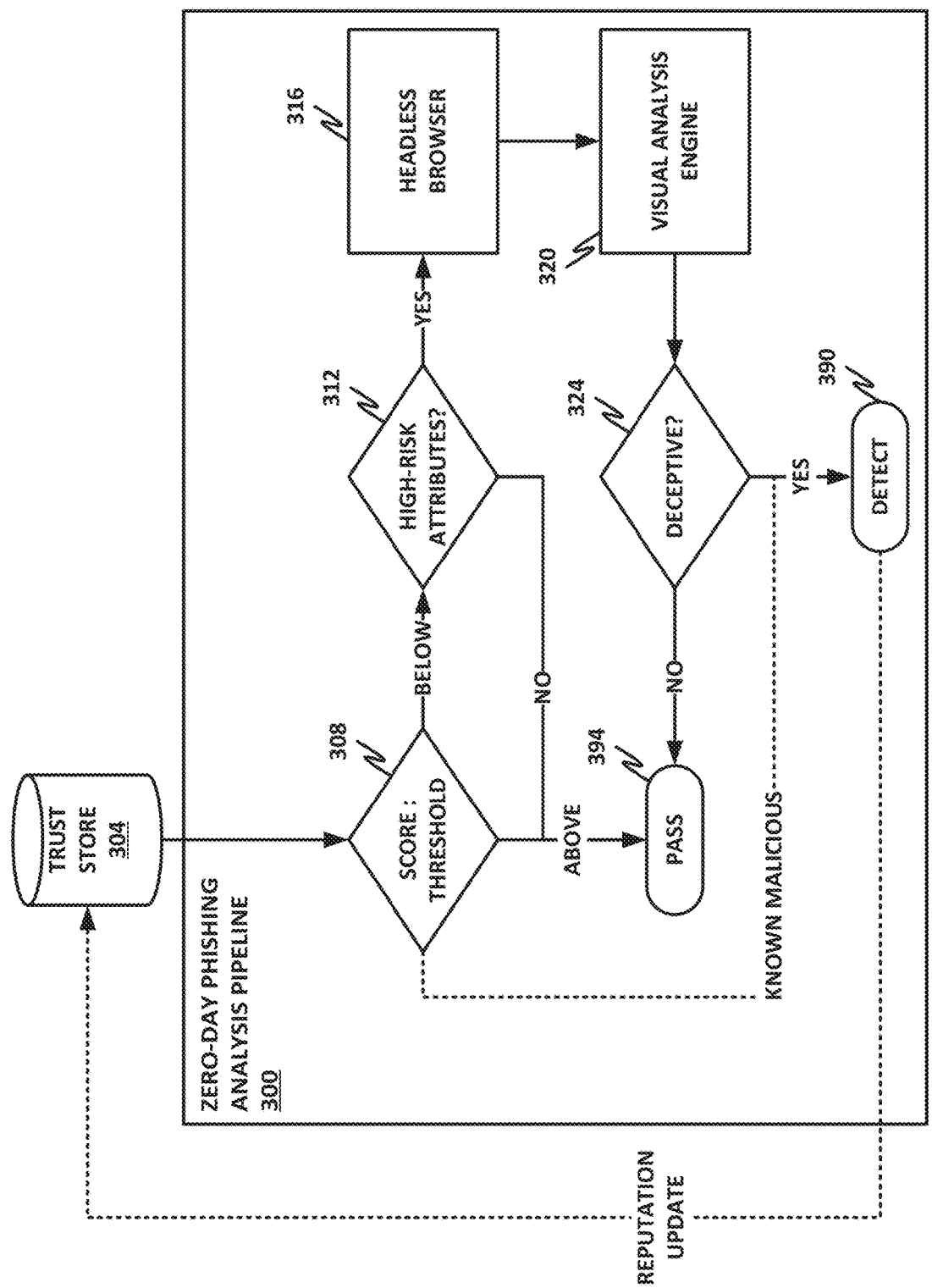
FIG. 3 is a block diagram illustrating a zero day phishing analysis pipeline.

FIG. 3 is a block diagram illustrating a zero day phishing analysis pipeline 300. Zero day phishing analysis pipeline 300 includes a number of stages of analysis for determining whether an unknown URL represents a zero day phishing attack. Note that a number of operations and/or modules are disclosed within zero day phishing analysis pipeline 300. It is not intended for this to imply that any of these modules or operations are necessarily required in a particular embodiment. Rather, the appended claims should stand on their own in defining which elements are required for a particular embodiment.

Within zero day phishing analysis pipeline 300, a trust store 304 may be queried initially to determine whether a particular URL already has a known reputation. In some embodiments, this reputation is represented as a trust score.

In decision block 308, the system may compare a score returned by trust store 304 with a particular threshold. In some cases, the score returned by trust store 304 may indicate simply that the URL is known to be malicious (e.g., the URL has been encountered before and has been classified with a high degree of confidence as being deceptive, malicious, or otherwise harmful). In that case, control may proceed directly to terminator 390, where the URL is detected as being malicious, and appropriate remedial action may be taken.

Returning to decision block 308, in an embodiment, another option is that the score is either above or below a particular threshold.

If the score is above the trust threshold, then the website is trusted and may be treated as a known, good website. In this case, flow control may flow directly to terminator 394, where the website is passed, and the user is permitted to interact with the website.

In at least some deployments, the flow from trust store 304, to decision block 308, to terminator 394 may represent the vast majority of websites that a user interacts with. On a day-to-day basis, it is uncommon for a user to visit a URL for the first time. It is even more uncommon for it to be the first time the user visits that URL within a given enterprise, and yet even more uncommon that it is the first time the URL has ever been visited globally. Depending on the security infrastructure in place, there may therefore be a cached reputation for the URL indicating that the URL is known, good, and trusted. Because flow normally passes from trust store 304, to decision block 308, to terminator 394, there is little disruption to the user's normal daily use of e-mail and the internet.

The second most common path may be from trust store 304, to decision block 308, to detection terminator 390. This represents the second most common scenario, where a website is known to the individual or the enterprise, and is known to be malicious. In this case, the known malicious website can simply be detected and blocked. Indeed, if the known malicious website is included in a link in an e-mail, the e-mail may simply be deleted by a corporate e-mail scanner, or placed in the user's spam folder so that there is little likelihood that the user may ever even see the e-mail. Again, this represents minimal disruption of the user's daily interaction with e-mail and the internet, particularly for legitimate purposes.

It should be noted that trust store 304 may be a local cache on the user's machine, an enterprise cache, and/or a global reputation store such as the GTI™ database provided by MCAFEE, LLC. In some embodiments, multiple layers of caching may be used. A local trust cache may be maintained on the user's local machine to avoid making queries to a global or enterprise trust store unnecessarily. For an enterprise, a local trust store may be maintained on an enterprise gateway that monitors all traffic in and out of the enterprise. The enterprise gateway can quickly query its local trust store for known reputations cached for specific URLs, in and out of the enterprise. In the case of a global trust store, the individual user machine or the enterprise gateway may query the global trust store only when a URL is encountered that does not have a locally or enterprise cached reputation.

If control flows from decision block 308 to decision block 312, this means that the URL does not yet have a reliable reputation. This may mean that this is the first time the URL has been accessed on a local, enterprise, and/or global level, or it may mean that the URL has been encountered before, but has not yet received sufficient analysis to have a trustworthy score that either places it above the threshold, or that marks it as a known malicious website.

In block 312, an additional filter examines the URL to determine whether it has high risk attributes. This may include observing several factors such as, by way of non-limiting example:

Does the URL use HTTP instead of HTTPS?
If the website uses HTTPS, does it have a valid certificate that is assigned to this URL?
Is the certificate, if any, self-signed?
If the website has a valid certificate, does it belong to a subdomain of hosted personal webpages or blogs?
Does the source code indicate obvious input fields for a user to input information?
If there are input fields, are any of these visibly marked as being input fields for entering personal or sensitive information such as a username, password, bank account, credit card number, Social Security number, or any other sensitive or personal information?

In decision block 312, if the URL does not have high risk attributes, then it may be safe to pass the website at terminator 394. In this context, passing the website does not necessarily mean that the website is good or desirable. It simply means that the risk of a phishing attack is low. For example, if the website is an annoying advertisement that the user would like to dismiss, this is something that the user may be able to handle on his or her own. The primary concern for purposes of this particular example is whether the URL is likely to collect sensitive personal or enterprise data from the user.

Because a website without input fields cannot collect data from the user, the website can be passed even if it doesn't have a known good reputation.

Thus, block 316 is encountered in the case where a URL does not have a known good score, and where the URL exhibits high risk attributes. Because this is expected to be a relatively small percentage of URLs encountered by the user or the enterprise, zero day phishing analysis pipeline 300 is expected to provide a streamlined analysis that provides minimal interruption to the user's daily personal and business activities.

If the conditions of blocks 308 and 312 are met, then in block 316, the system renders the webpage in a headless browser. Headless browser 316 includes a rendering engine similar or identical to the one that would be used by a human user. For example, headless browser 316 may include an embodiment of the WebKit web browser engine or Chrome browser core. However, headless browser 316 is not an interactive browser for users, but rather renders the webpage for analysis within zero day phishing analysis pipeline 300.

A visual analysis engine 320 observes the output of headless browser 316. Visual analysis engine 320 may include a machine learning model that has been trained on the actual websites of a number of web resources that may be high value targets for phishing attacks. Visual analysis engine 320 includes a digital eye that can determine whether the output of headless browser 316 "looks like" a known website that may be the target of a phishing attack. If the digital eye of headless browser 316 determines that the rendered website looks like one of the common phishing targets, then in decision block 324, zero day phishing analysis pipeline 300 may determine that the website is malicious. If, on the other hand, the URL does not look like a website that might be a target for a phishing attack, then it can be marked as not deceptive.

Thus, in decision block 324, if the website has been marked as deceptive, then in terminator 390, the website is detected as malicious and appropriate remedial action may be taken. Furthermore, a reputation update may be provided to trust store 304 so that when the URL is encountered in the future, it may have a known malicious reputation.

Returning to decision block 324, if the website has been analyzed and been found not to be deceptive, then in terminator 394, the website is passed and the user is permitted to interact with the website. Again, in some cases, a reputation update may be provided to trust store 304 so that the next time the URL is encountered, there is no need for analysis by visual analysis engine 320.

Figure 4:
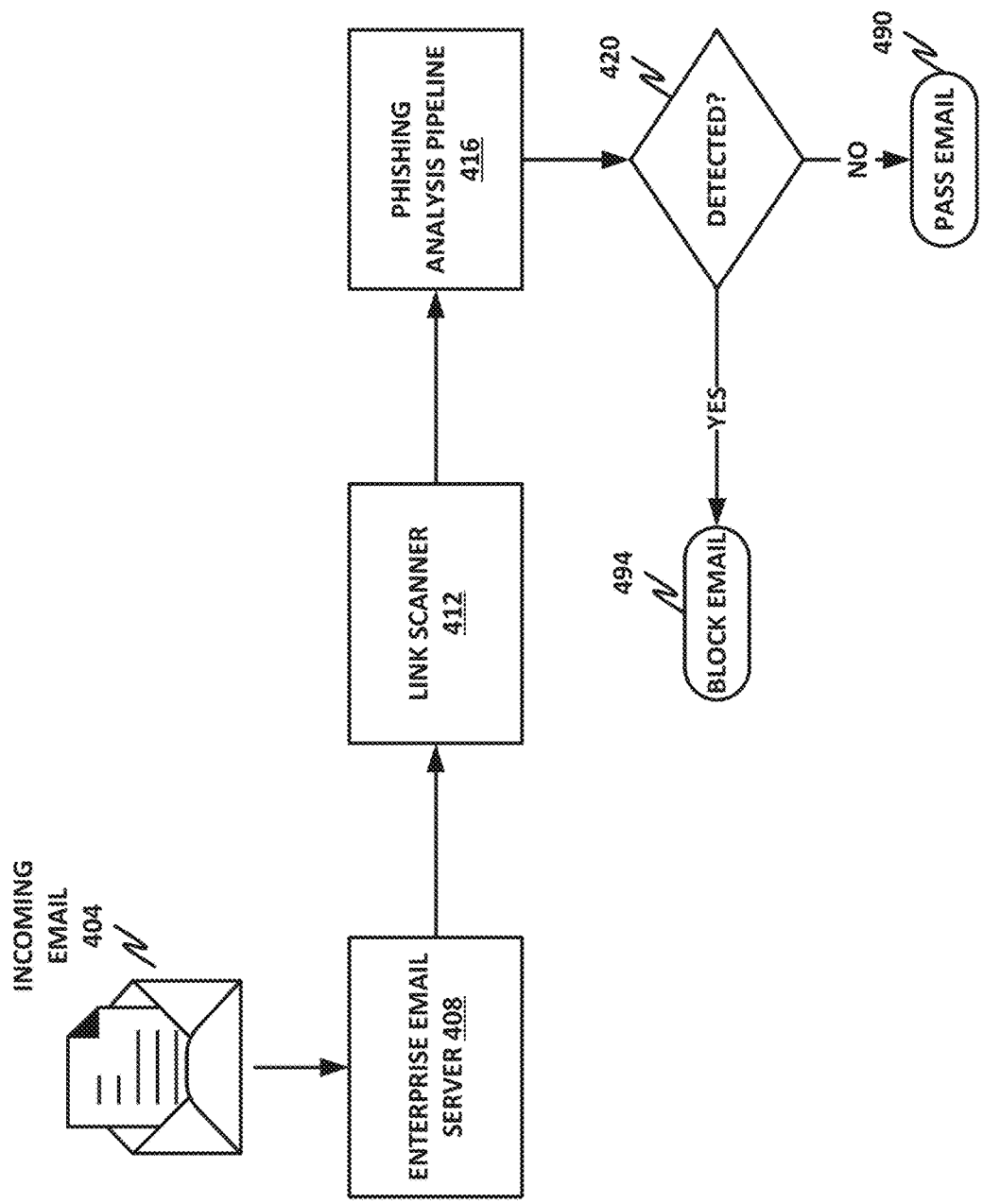
FIG. 4 is a block diagram illustrating the use of a phishing analysis pipeline in an enterprise e-mail server.

FIG. 4 is a block diagram illustrating the use of a phishing analysis pipeline 416 in an enterprise e-mail server 408.

In this example, enterprise e-mail server 408 receives an incoming e-mail 404. As a matter of course, all incoming e-mails 404 may be scanned by enterprise e-mail server 408 to determine whether they include malicious content. In the case of enterprise e-mail server 408, it may be more reasonable to scan all incoming e-mails, because e-mail is not expected to be a real-time communication medium. Thus, a slight latency in processing of e-mails is more acceptable to enterprise or personal users than a delay in loading webpages within a web browser.

A link scanner 412 scans incoming e-mail 404 for any URLs of links provided within e-mail 404. These links may be provided to a phishing analysis pipeline 416. Phishing analysis pipeline 416 may, in some cases, be an embodiment of zero day phishing analysis pipeline 300 of FIG. 3. Phishing analysis pipeline 416 may load all of the provided URLs in a headless browser and observe the loaded pages to determine whether they are apparently malicious. It should also be noted that phishing analysis pipeline 416 may have pre-analysis filters, such as a score threshold and analysis for high risk attributes.

In decision block 420, it is determined whether any of the incoming URLs were detected as malicious.

If one or more URLs are detected as malicious, then in terminator 494, the e-mail may be blocked. Depending on the configuration, the e-mail may be deleted, not delivered, or sent to a user's spam folder.

Returning to decision block 420, if the URL is not detected as malicious, then in terminator 490, the e-mail is passed on to the user.

Figure 5:
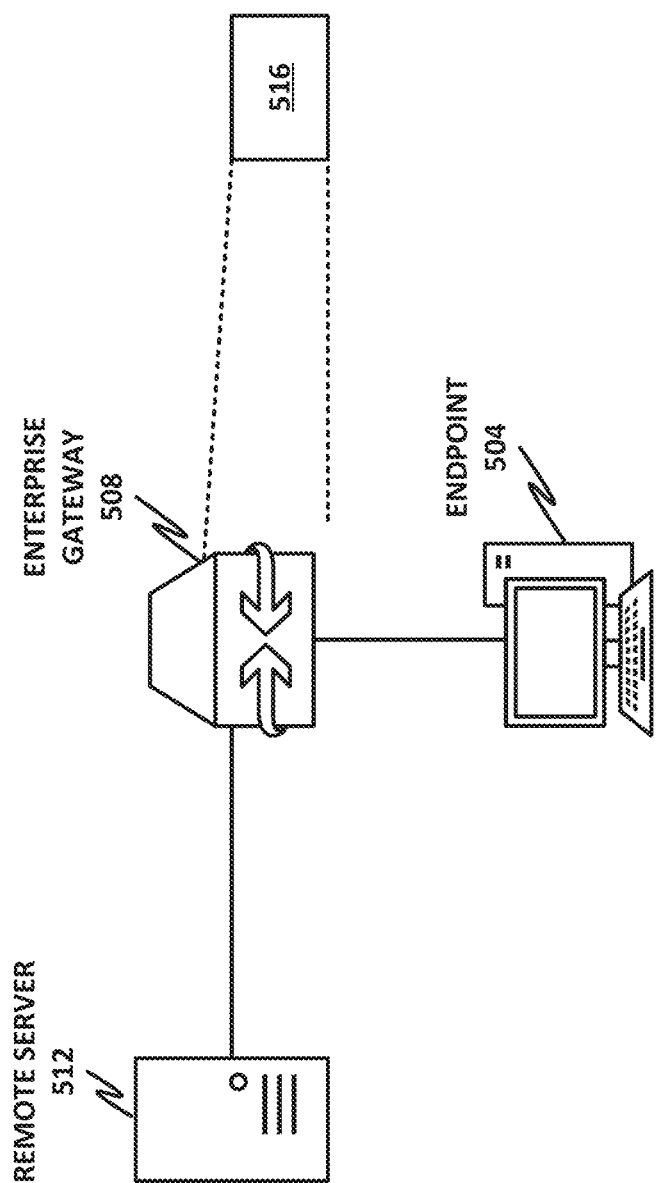
FIG. 5 is an illustration of an enterprise gateway.

FIG. 5 is an illustration of an enterprise gateway 508. In this example, enterprise gateway 508 may also include a phishing analysis pipeline 516. Again, phishing analysis pipeline 516 may be an example or embodiment of zero day phishing analysis pipeline 300 of FIG. 3, or any other suitable phishing analysis pipeline.

In this case, endpoint 504 requests a website from remote server 512. When enterprise gateway 508 receives the request to access the URL, it may pass the URL through phishing analysis pipeline 516. If the URL is detected as deceptive, then the request may be blocked, and optionally, a user of endpoint 504 may be notified. On the other hand, if the URL is not detected as malicious, then the user may be permitted to communicate with remote server 512.

Note that in this embodiment, the use of pre-analysis filters as illustrated in FIG. 3 may help to ensure that the user's browsing experience and normal personal and enterprise use of the internet is not interrupted by phishing analysis pipeline 516.

Figure 6:
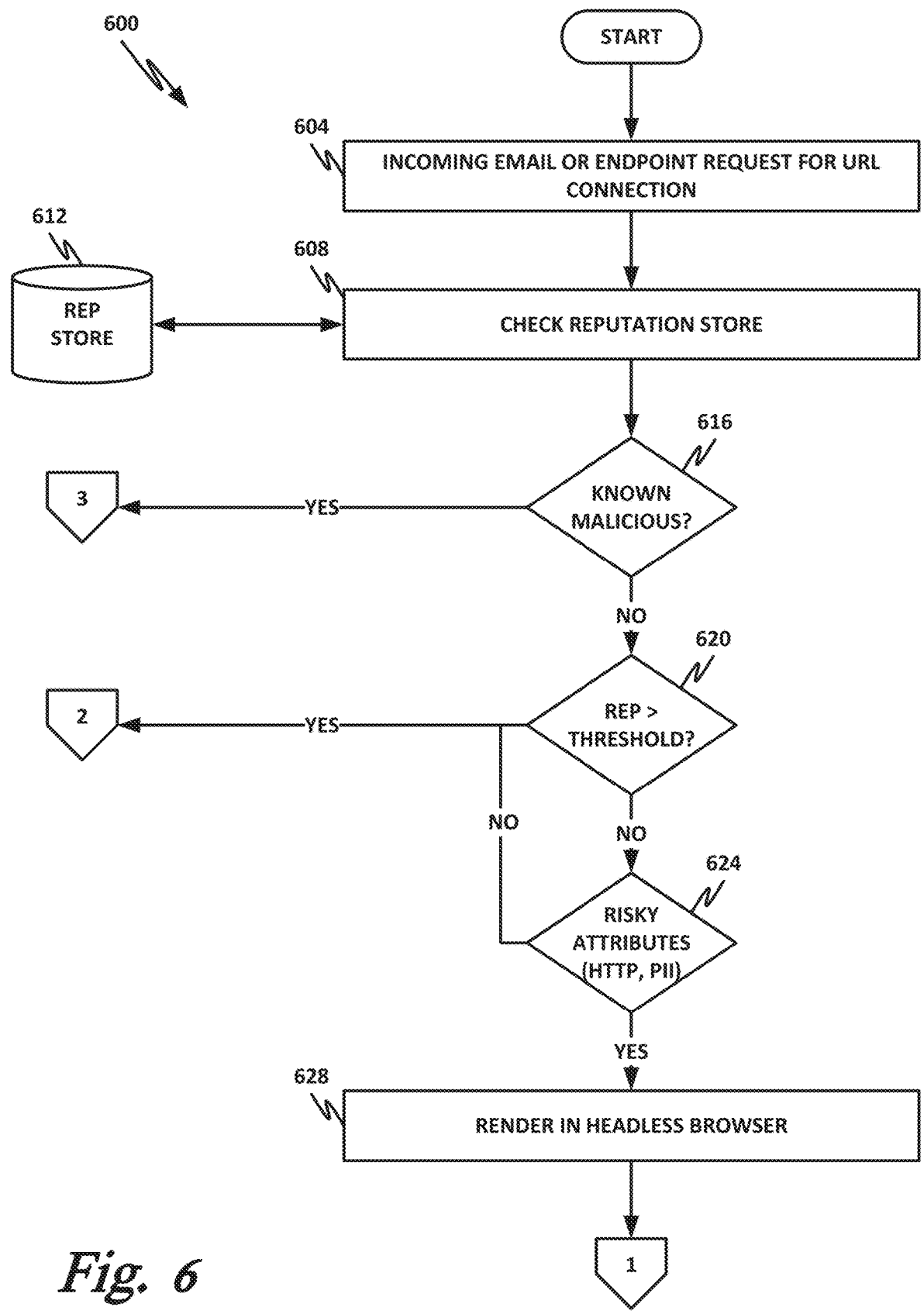
FIGS. 6-7 are a flowchart of a method of performing zero day phishing analysis.
Figure 7:
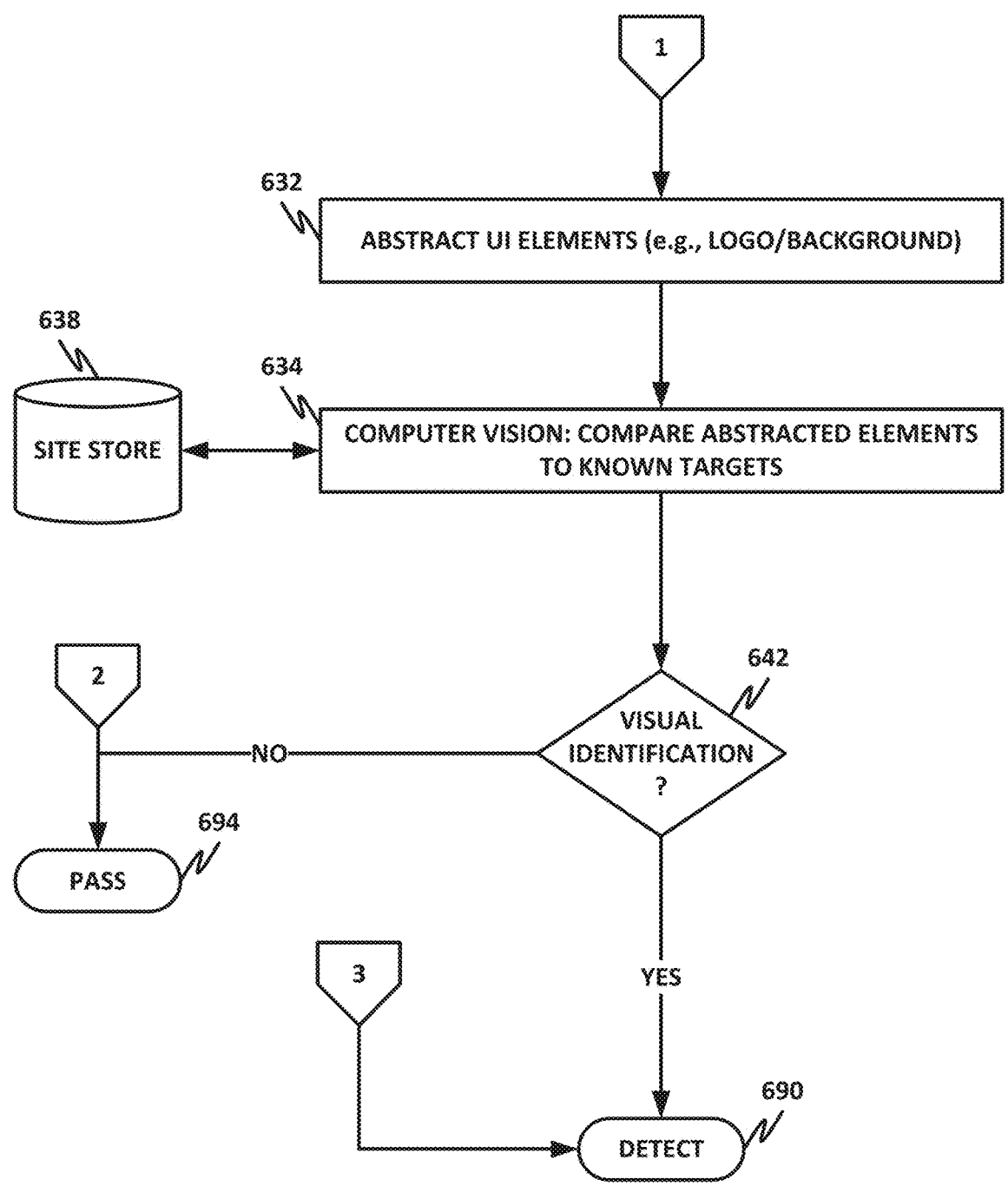

FIGS. 6-7 are a flowchart of a method 600 of performing zero day phishing analysis.

At block 604, the system detects an incoming e-mail with URL links, or there is a request by an endpoint for access to connect to a particular URL. This triggers the need for analysis of the URL.

In block 608, the system queries an existing reputation store 612 for a reputation for the URL. Reputation store 612 may be a local machine level URL cache, an enterprise level URL cache, a global URL cache, or any combination of the foregoing.

In decision block 616, the system determines whether the URL under analysis is known to be malicious.

If the URL is known to be malicious, then following off-page connector 3 to FIG. 7, the URL is detected at terminator 690. Upon detection, some appropriate action may be taken, such as remedial action against the known malicious URL.

Returning to decision block 616 of FIG. 6, if the URL is not known malicious, then in block 620, the system determines whether the URL has a reputation greater than a reputation threshold.

If the reputation is higher than the threshold, then following off-page connector 2 to FIG. 7, at terminator 694, the URL is passed. This means that the user is allowed to interact with the URL, and/or the e-mail is permitted to be delivered. Note that in some embodiments, this is expected to be the most common path. The URL is detected as known not malicious, and the user is permitted to interact.

Returning to decision block 620 of FIG. 6, if the reputation is not greater than the threshold, then this means that either the URL is being encountered for the first time (at a personal, enterprise, and/or global level), or that the URL has been encountered before and has not yet received a reliable reputation score.

In decision block 624, the source code for the URL is analyzed to determine whether it has risky attributes, as discussed above. This could be the use of HTTP, the use of an invalid or suspicious certificate, the use of input fields, the use of labels for PII or sensitive information on input fields, or other risk attributes.

The various risk attributes may be weighted appropriately to the embodiment and to particular enterprise needs. For example, the mere fact that the URL has a valid HTTPS certificate may not necessarily mean that it is to be passed. In various embodiments, the risk attributes may be assigned certain weights and combined in different ways.

If the overall result of decision block 624 is that the URL is not deemed risky, then following off-page connector 2 to FIG. 7, in terminator 694 the URL or the e-mail is passed and the user is permitted to interact.

Returning to decision block 624 of FIG. 6, if the URL is deemed to have sufficient risky attributes, then in block 628, the URL is rendered in a headless browser.

Following off-page connector 1 to block 632, in some embodiments, certain user interface (UI) elements may be abstracted from the rendered webpage. These can include, by way of illustrative and nonlimiting example, a corporate logo, a background style, and the use of fonts, background colors, and other visual indicia that may be used to deceive a user into thinking that a webpage is provided by a particular provider.

In block 634, a computer vision or digital eye is applied to either the abstracted elements or to the rendered webpage as a whole.

The computer vision system accesses a site store 638 that includes cached versions of webpages for high value targets of phishing attacks. Note that this may include not only the current version of a website, but also past versions going back for a particular time, such as six months, one year, five years, 10 years, or more. The number of cached versions of a website to maintain may, in some cases, depend on the value of the website. In the case of a website for a large banking venture, there may be many cached versions stored, because of the increased risk. For a website that is less popular and that collects less personal information, fewer cached versions may be maintained.

In block 642, the digital eye or computer vision system analyzes the abstracted website elements, or the rendered website as a whole, to determine whether it can visually identify the website as being an example of a known website in the site store 638. If the website is identified as visually being an example of a known website, and if it does not have valid credentials (e.g., a URL owned by the owner of that website, and/or a digital certificate owned by the owner of that website), then the website may be detected as a phishing website.

If the website is not detected, then at terminator 694, the website is passed and the user is permitted to interact with the URL or to access the e-mail.

Returning to decision block 642, if a visual identification is made, then the website may be deemed to be a malicious phishing website, and at terminator 690, the website is detected. Upon detection, appropriate remedial action may be taken, such as warning the user, warning an enterprise security administrator, blocking the website, blocking the e-mail, or taking other remedial action.

Figure 8:
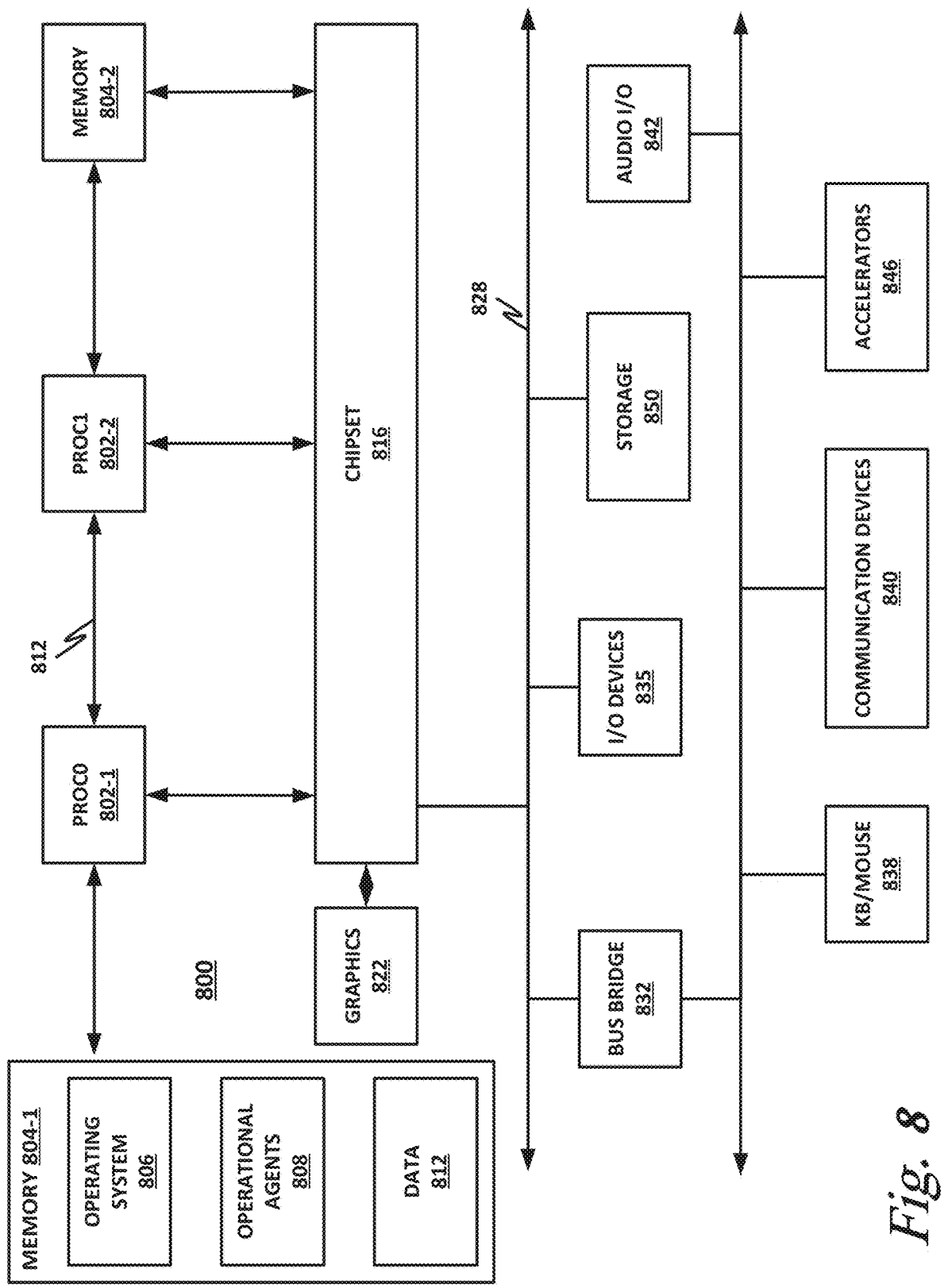
FIG. 8 is a block diagram illustrating selected elements of a hardware platform.

FIG. 8 is a block diagram of a hardware platform 800. Embodiments of hardware platform 800 may be configured or adapted to provide visual detection of phishing websites via headless browser, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via network interface 848, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
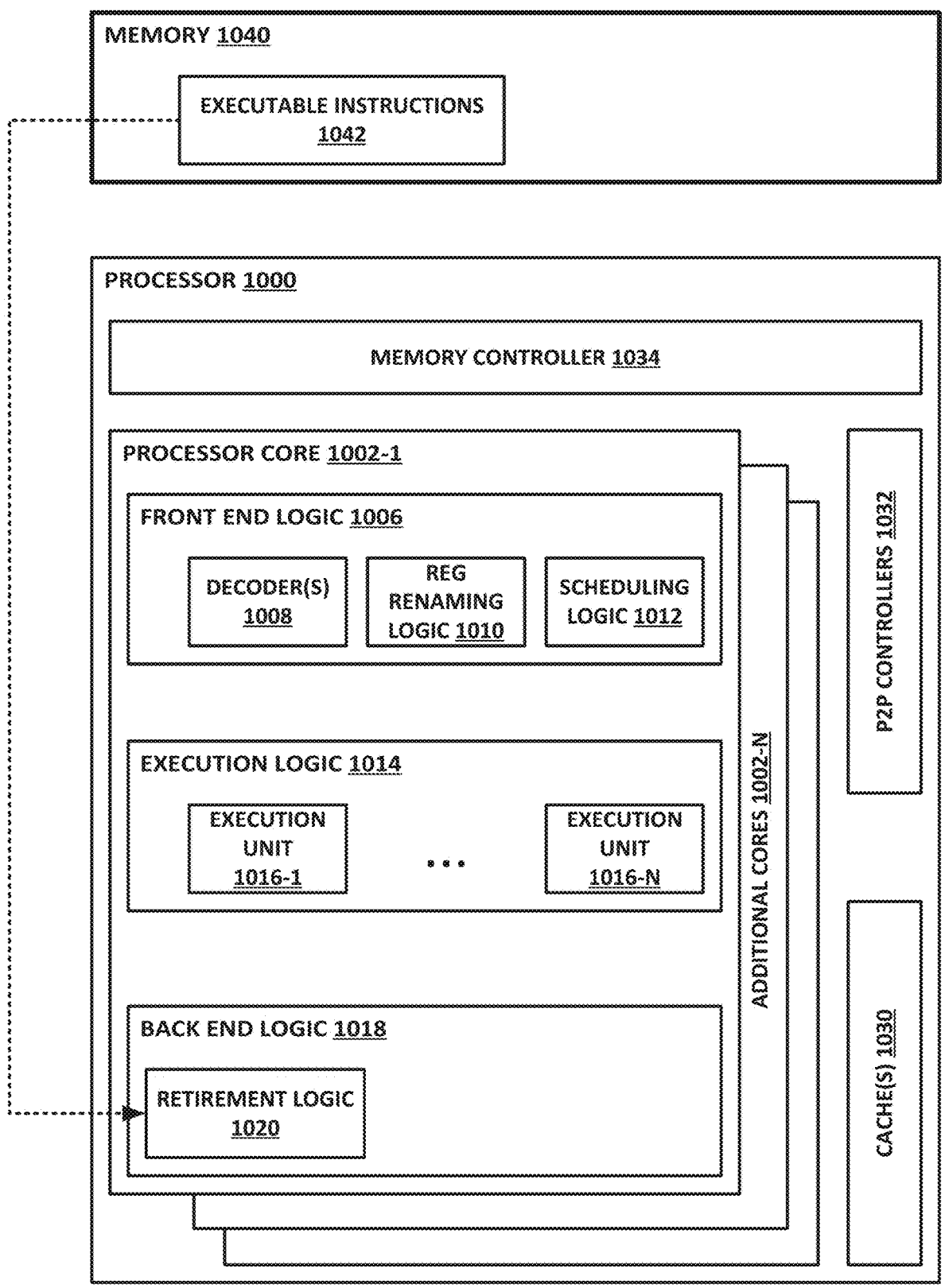
FIG. 10 is a block diagram of selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a central processor unit (CPU) 1112 or on one or more different dies or packages. Each chipset may support any suitable number of CPUs 802. A chipset 816 (which may be a chipset, uncore, Northbridge, Southbridge, or other suitable logic and circuitry) may also include one or more controllers to couple other components to one or more CPUs.

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with processor 810 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of CPUs 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own graphics processing unit (GPU).

Chipset 816 may be in communication with a bus 828 via an interface circuit. Bus 828 may have one or more devices that communicate over it, such as a bus bridge 832, I/O devices 835, network interface 848, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by network interface 848 and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O devices 842, a data storage device 844, and/or accelerators 846. In alternative embodiments, any portions of the bus architectures could be implemented with one or more PtP links.

Operating system 806 may be, for example, Microsoft Windows, Linux, UNIX, Mac OS X, IOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, processor 802 may retrieve a copy of the operational agent (or software portions thereof) from storage 850 and load it into memory 804. Processor 810 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic input/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 848 may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCOE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 848 may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
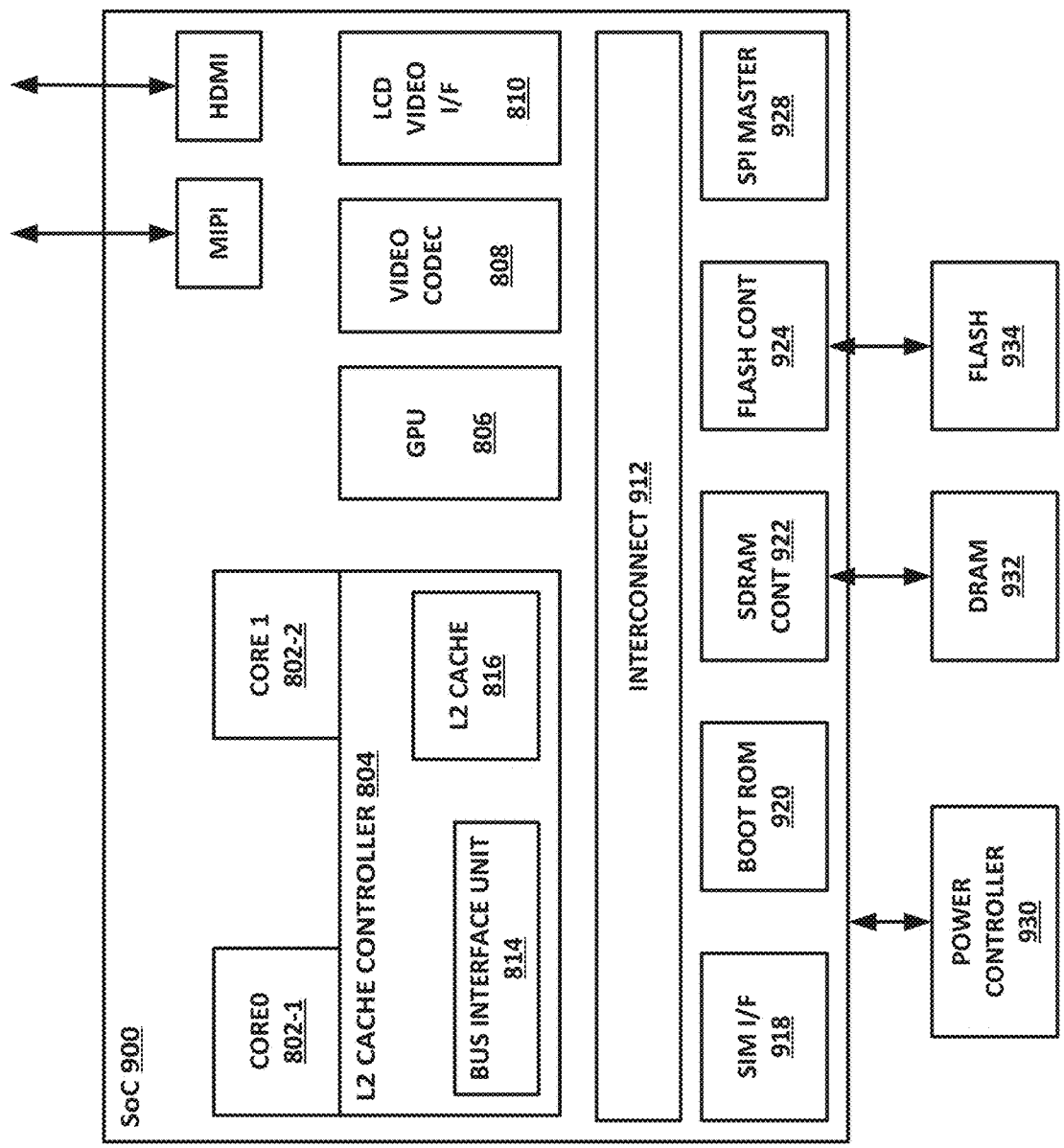
FIG. 9 is a block diagram illustrating selected elements of a system-on-a-chip (SoC).

FIG. 9 is a block illustrating selected elements of an example SoC 900. Embodiments of SoC 900 may be configured or adapted to provide visual detection of phishing websites via headless browser, as disclosed in the present specification.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 900 could also be integrated into, for example, a PC, server, video processing components, laptop computer, notebook computer, netbook, or touch-enabled device.

As with hardware platform 800 above, SoC 900 may include multiple cores 902a and 902b. In this illustrative example, SoC 900 also includes an L2 cache control 904, a GPU 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/HDMI links that couple to an LCD.

SoC 900 may also include a subscriber identity module (SIM) I/F 918, a boot ROM 920, a synchronous dynamic random access memory (SDRAM) controller 922, a flash controller 924, a serial peripheral interface (SPI) master 928, a suitable power control 930, a dynamic RAM (DRAM) 932, and flash 934. In addition, one or more embodiments include one or more communication capabilities, interfaces, and features such as instances of Bluetooth™ 936, a 3G modem 938, a global positioning system (GPS) 940, and an 802.11 Wi-Fi 942.

Designers of integrated circuits such as SoC 900 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 10 is a block diagram illustrating selected elements of a processor 1000. Embodiments of processor 1000 may be configured or adapted to provide visual detection of phishing websites via headless browser, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

Figure 11:
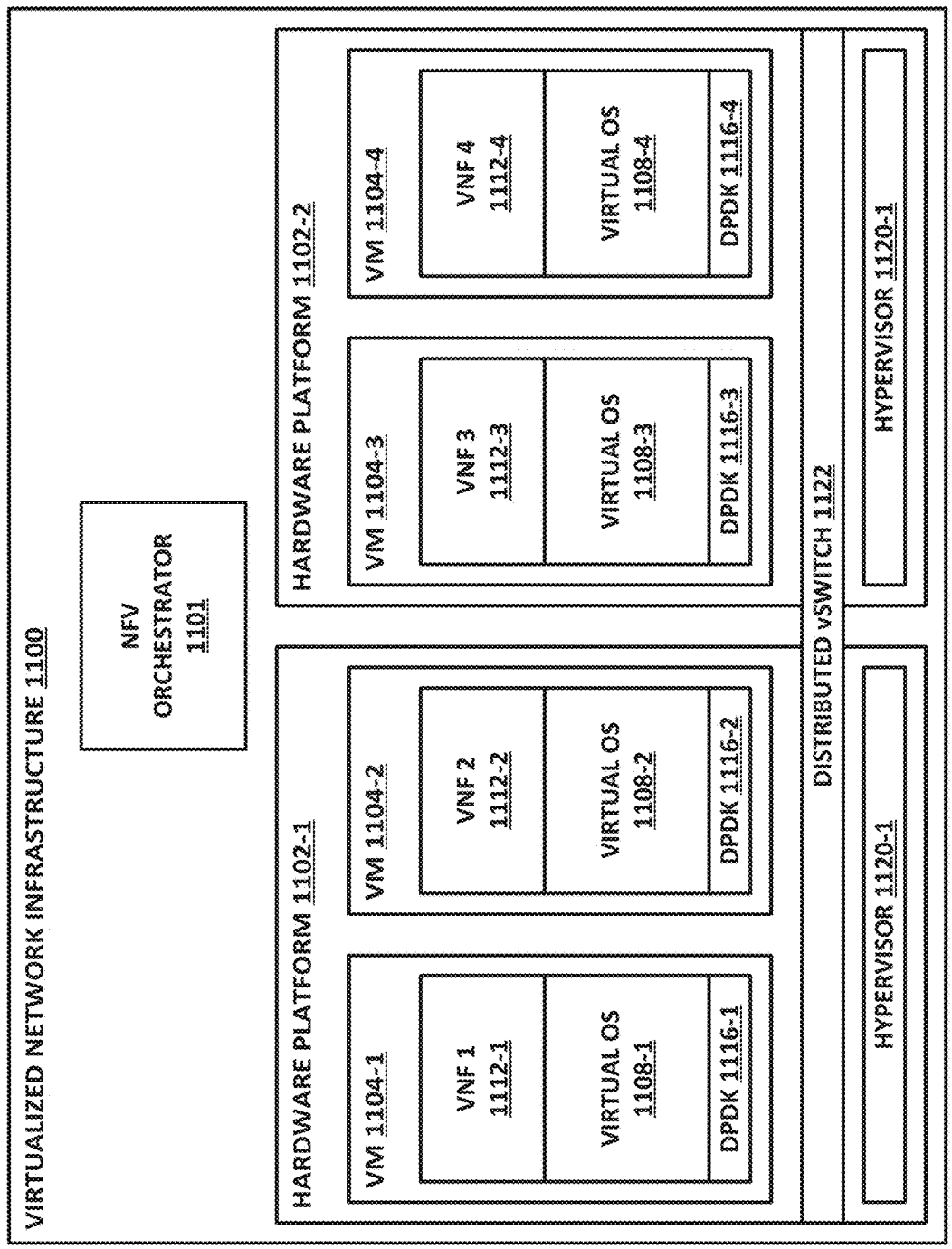
FIG. 11 is a block diagram of selected elements of a network function virtualization (NFV) infrastructure.

FIG. 11 is a block diagram of a network function virtualization (NFV) infrastructure 1100. Embodiments of NFV infrastructure 1100 may be configured or adapted to provide visual detection of phishing websites via headless browser, as disclosed in the present specification.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMS 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed, in one example, a computing apparatus, comprising: a processor and a memory; a network interface; and instructions encoded within the memory to instruct the processor to: receive a uniform resource locator (URL) for analysis, the URL to access a web page via a remote server; via the network interface, retrieve from the remote server a copy of the web page; render the web page in a headless browser to provide a computer-accessible visual output; perform visual analysis of the visual output via a digital eye; compare the visual analysis to a plurality of known phishing target websites; and if the comparison identifies the web page as visually similar to a known phishing target website, detect the web page as a phishing web page.

There is further disclosed an example computing apparatus, wherein the instructions are further to provide a pre-filter stage before retrieving the web page from the remote server.

There is further disclosed an example computing apparatus, wherein the pre-filter stage comprises checking whether the URL has an existing cached local, enterprise, or global reputation.

There is further disclosed an example computing apparatus, wherein the instructions are to pass the URL if it has a known benign reputation.

There is further disclosed an example computing apparatus, wherein the instructions are to block the URL if it has a known malicious or phishing reputation.

There is further disclosed an example computing apparatus, wherein the pre-filter stage comprises identifying the URL for visual analysis only if it has input fields.

There is further disclosed an example computing apparatus, wherein the pre-filter stage comprises identifying the URL for visual analysis if the input fields collect potentially private or sensitive information.

There is further disclosed an example computing apparatus, wherein the pre-filter stage comprises identifying the URL for visual analysis if the purpose of the input fields cannot be determined.

There is further disclosed an example computing apparatus, wherein the pre-filter stage comprises identifying the URL for visual analysis if it includes non-encrypted hypertext transfer protocol (HTTP).

There is further disclosed an example computing apparatus, wherein the pre-filter stage comprises identifying the URL for visual analysis if the web page provides a self-signed transport layer security (TLS) certificate.

There is further disclosed an example computing apparatus, wherein the pre-filter stage comprises identifying the URL for visual analysis if the web page provides a transport layer security (TLS) certificate that does not match the URL.

There is further disclosed an example computing apparatus, wherein the pre-filter stage comprises identifying the URL for visual analysis if the web page is hosted on a personal blog or personal webpage subdomain of a reputable URL.

There is further disclosed an example computing apparatus, wherein performing visual analysis comprises abstracting out a selected element of the visual output.

There is further disclosed an example computing apparatus, wherein the selected element is a logo.

There is further disclosed an example computing apparatus, wherein the selected element is a font.

There is further disclosed an example computing apparatus, wherein the selected element is a background color or image.

There is further disclosed an example computing apparatus, wherein the instructions are part of a web gateway.

There is further disclosed an example computing apparatus, wherein the instructions are part of an e-mail scanner.

There is also disclosed an example of one or more tangible, non-transitory computer-readable media having stored thereon executable instructions to: select a uniform resource locator (URL) for visual analysis, the URL to access a web page under analysis via a remote server; retrieve a copy of the web page under analysis from the remote server; visually analyze the web page under analysis, comprising: visually rendering the web page under analysis in a headless browser; applying a computer vision machine learning model to the visual rendering, the machine learning model trained on a plurality of web pages known to be phishing targets; within the computer vision machine learning model, detecting the web page under analysis as an instance of a web page known to be a phishing target; detecting the web page under analysis as a phishing attack; and blocking the web page under analysis.

There is further disclosed an example of one or more tangible, non-transitory computer-readable media, wherein selecting the URL for visual analysis comprises applying a pre-filter stage.

There is further disclosed an example of one or more tangible, non-transitory computer-readable media, wherein the pre-filter stage comprises checking whether the URL has an existing cached local, enterprise, or global reputation.

There is further disclosed an example of one or more tangible, non-transitory computer-readable media, wherein the instructions are to pass the URL if it has a known benign reputation.

There is further disclosed an example of one or more tangible, non-transitory computer-readable media, wherein the instructions are to block the URL if it has a known malicious or phishing reputation.

There is further disclosed an example of one or more tangible, non-transitory computer-readable media, wherein the pre-filter stage comprises identifying the URL for visual analysis only if it has input fields.

There is further disclosed an example of one or more tangible, non-transitory computer-readable media, wherein the pre-filter stage comprises identifying the URL for visual analysis if the input fields collect potentially private or sensitive information.

There is further disclosed an example of one or more tangible, non-transitory computer-readable media, wherein the pre-filter stage comprises identifying the URL for visual analysis if the purpose of the input fields cannot be determined.

There is further disclosed an example of one or more tangible, non-transitory computer-readable media, wherein the pre-filter stage comprises identifying the URL for visual analysis if it includes non-encrypted hypertext transfer protocol (HTTP).

There is further disclosed an example of one or more tangible, non-transitory computer-readable media, wherein the pre-filter stage comprises identifying the URL for visual analysis if the web page provides a self-signed transport layer security (TLS) certificate.

There is further disclosed an example of one or more tangible, non-transitory computer-readable media, wherein the pre-filter stage comprises identifying the URL for visual analysis if the web page provides a transport layer security (TLS) certificate that does not match the URL.

There is further disclosed an example of one or more tangible, non-transitory computer-readable media, wherein the pre-filter stage comprises identifying the URL for visual analysis if the web page is hosted on a personal blog or personal webpage subdomain of a reputable URL.

There is further disclosed an example of one or more tangible, non-transitory computer-readable media, wherein performing visual analysis comprises abstracting out a selected element of the visual output.

There is further disclosed an example of one or more tangible, non-transitory computer-readable media, wherein the selected element is a logo.

There is further disclosed an example of one or more tangible, non-transitory computer-readable media, wherein the selected element is a font.

There is further disclosed an example of one or more tangible, non-transitory computer-readable media, wherein the selected element is a background color or image.

There is further disclosed an example of one or more tangible, non-transitory computer-readable media, wherein the instructions are part of a web gateway.

There is further disclosed an example of one or more tangible, non-transitory computer-readable media, wherein the instructions are part of an e-mail scanner.

There is also disclosed an example computer-implemented method of providing zero-day-capable phishing detection for unknown URLs, comprising: receiving an incoming URL providing a reference to a web page; determining that the URL does not have a known reliable reputation; applying a pre-filtering stage to the URL; upon determining that the URL did not pass the pre-filtering stage, subjecting the URL to visual machine learning analysis, comprising: rendering the web page in a headless browser to provide a machine-readable visual representation of the web page; instructing a machine learning model to identify the web page, wherein the machine learning model has been trained on a set of web page captures of online services known to be phishing targets; receiving an identification from the machine learning model; and if the machine learning model has identified the web page as being identical or substantially similar to a web service known to be a phishing target, detecting the URL as a phishing attack, and assigning the URL a malicious reputation.

There is further disclosed an example method, wherein the pre-filter stage comprises identifying the URL for visual analysis if it has input fields.

There is further disclosed an example method, wherein the pre-filter stage comprises identifying the URL for visual analysis if the input fields collect potentially private or sensitive information.

There is further disclosed an example method, wherein the pre-filter stage comprises identifying the URL for visual analysis if the purpose of the input fields cannot be determined.

There is further disclosed an example method, wherein the pre-filter stage comprises identifying the URL for visual analysis if it includes non-encrypted hypertext transfer protocol (HTTP).

There is further disclosed an example method, wherein the pre-filter stage comprises determining that the web page provides a self-signed transport layer security (TLS) certificate.

There is further disclosed an example method, wherein the pre-filter stage comprises determining that the URL provides a transport layer security (TLS) certificate that does not match the URL.

There is further disclosed an example method, wherein the pre-filter stage comprises determining that the web page is hosted on a personal blog or personal webpage subdomain of a reputable URL.

There is further disclosed an example method, wherein performing visual analysis comprises abstracting out a selected element of the visual output.

There is further disclosed an example method, wherein the selected element is a logo.

There is further disclosed an example method, wherein the selected element is a font.

There is further disclosed an example method, wherein the selected element is a background color or image.

There is further disclosed an example method, further comprising providing the method as part of a web gateway.

There is further disclosed an example method, further comprising providing the method as part of an e-mail scanner.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

The is further disclosed an computer-implemented method of protecting a user from phishing attacks, comprising: detecting that the user has opened a website associated with a uniform resource locator (URL), and determining that the URL does not have a known good reputation; rendering a test version of the website in a headless web browser, including abstracting the website into at least one visual element of the test version; visually inspecting the test version of the website with a digital eye, and determining that the test version of the web looks like a known legitimate website not associated with the URL; and based on the visual inspection, warning the user that the website is or may be a phishing website.

There is further disclosed an example, further comprising querying a cloud reputation service to determine that the URL does not have a known good reputation.

There is further disclosed an example, further comprising querying a local reputation cache to determine that the URL does not have a known good reputation.

There is further disclosed an example, further comprising determining that the user has not previously visited the URL to determine that the URL does not have a known good reputation.

There is further disclosed an example, wherein abstracting the at least one visual element includes a corporate logo.

There is further disclosed an example, wherein abstracting the at least one visual element includes a font.

There is further disclosed an example, wherein abstracting the at least one visual element includes a background color.

There is further disclosed an example, wherein abstracting the at least one visual element includes a background pattern.

There is further disclosed an example, wherein abstracting the at least one visual element includes a color scheme.

There is further disclosed an example, wherein determining that the test version of the website looks like the known legitimate website not associated with the URL comprises determining that the URL is a non-secure hypertext transport protocol (HTTP) URL.

There is further disclosed an example, wherein determining that the test version of the website looks like the known legitimate website not associated with the URL comprises determining that the URL uses transport layer security (TLS), but that a certificate of the URL is not associated with the known legitimate website.

There is further disclosed an example, wherein determining that the test version of the website looks like the known legitimate website not associated with the URL comprises determining that the URL belongs to a blogs or personal webpages subdomain of a known third-party service not associated with the known legitimate website.

There is further disclosed an example of an apparatus comprising means for performing the method.

There is further disclosed an example, wherein the means for performing the method comprise a processor and a memory.

There is further disclosed an example, wherein the memory comprises machine-readable instructions that, when executed, cause the apparatus to perform the method.

There is further disclosed an example, wherein the apparatus is a computing system.

There is further disclosed an example of at least one computer readable medium comprising instructions that, when executed, implement a method or realize an apparatus described.

There is further disclosed an example of one or more tangible, nontransitory computer-readable storage media having stored thereon executable instructions to: detect that a user has opened a website associated with a uniform resource locator (URL), and determine that the URL does not have a known good reputation; render a test version of the website in a headless web browser, including abstracting the website into at least one visual element of the test version; visually inspect the test version of the website with a digital eye, and determine that the test version of the web looks like a known legitimate website not associated with the URL; and based on the visual inspection, warn the user that the website is or may be a phishing website.

There is further disclosed an example, wherein the instructions are further to query a cloud reputation service to determine that the URL does not have a known good reputation.

There is further disclosed an example, wherein the instructions are further to query a local reputation cache to determine that the URL does not have a known good reputation.

There is further disclosed an example, wherein the instructions are further to determine that the user has not previously visited the URL to determine that the URL does not have a known good reputation.

There is further disclosed an example, wherein abstracting the at least one visual element includes a corporate logo.

There is further disclosed an example, wherein abstracting the at least one visual element includes a font.

There is further disclosed an example, wherein abstracting the at least one visual element includes a background color.

There is further disclosed an example, wherein abstracting the at least one visual element includes a background pattern.

There is further disclosed an example, wherein abstracting the at least one visual element includes a color scheme.

There is further disclosed an example, wherein determining that the test version of the website looks like the known legitimate website not associated with the URL comprises determining that the URL is a non-secure hypertext transport protocol (HTTP) URL.

There is further disclosed an example, wherein determining that the test version of the website looks like the known legitimate website not associated with the URL comprises determining that the URL uses transport layer security (TLS), but that a certificate of the URL is not associated with the known legitimate website.

There is further disclosed an example, wherein determining that the test version of the website looks like the known legitimate website not associated with the URL comprises determining that the URL belongs to a blogs or personal webpages subdomain of a known third-party service not associated with the known legitimate website.

There is further disclosed an example of a computing apparatus, comprising: a hardware platform comprising a processor circuit and a memory; and instructions encoded within the memory to instruct the processor circuit to: detect that a user has opened a website associated with a uniform resource locator (URL), and determine that the URL does not have a known good reputation; render a test version of the website in a headless web browser, including abstracting the website into at least one visual element of the test version; visually inspect the test version of the website with a digital eye, and determine that the test version of the web looks like a known legitimate website not associated with the URL; and based on the visual inspection, warn the user that the website is or may be a phishing website.

There is further disclosed an example, wherein the instructions are further to query a cloud reputation service to determine that the URL does not have a known good reputation.

There is further disclosed an example, wherein the instructions are further to query a local reputation cache to determine that the URL does not have a known good reputation.

There is further disclosed an example, wherein the instructions are further to determine that the user has not previously visited the URL to determine that the URL does not have a known good reputation.

There is further disclosed an example, wherein abstracting the at least one visual element includes a corporate logo.

There is further disclosed an example, wherein abstracting the at least one visual element includes a font.

There is further disclosed an example, wherein abstracting the at least one visual element includes a background color.

There is further disclosed an example, wherein abstracting the at least one visual element includes a background pattern.

There is further disclosed an example, wherein abstracting the at least one visual element includes a color scheme.

There is further disclosed an example, wherein determining that the test version of the website looks like the known legitimate website not associated with the URL comprises determining that the URL is a non-secure hypertext transport protocol (HTTP) URL.

There is further disclosed an example, wherein determining that the test version of the website looks like the known legitimate website not associated with the URL comprises determining that the URL uses transport layer security (TLS), but that a certificate of the URL is not associated with the known legitimate website.

There is further disclosed an example, wherein determining that the test version of the website looks like the known legitimate website not associated with the URL comprises determining that the URL belongs to a blogs or personal webpages subdomain of a known third-party service not associated with the known legitimate website.

There is further disclosed an example, wherein the computing apparatus is a desktop computer.

There is further disclosed an example, wherein the computing apparatus is a workstation.

There is further disclosed an example, wherein the computing apparatus is a laptop computer.

There is further disclosed an example, wherein the computing apparatus is a notebook computer.

There is further disclosed an example, wherein the computing apparatus is a netbook.

There is further disclosed an example, wherein the computing apparatus is a tablet computer.

There is further disclosed an example, wherein the computing apparatus is a convertible tablet computer.

There is further disclosed an example, wherein the computing apparatus is a smart phone.

There is further disclosed an example, wherein the computing apparatus is an Android phone.

There is further disclosed an example, wherein the computing apparatus is an iPhone.

There is further disclosed an example, wherein the computing apparatus is a Windows phone.

There is further disclosed an example, wherein the computing apparatus is a server.

There is further disclosed an example, further comprising a guest infrastructure to realize server functions.

There is further disclosed an example, wherein the guest infrastructure comprises virtualization infrastructure.

There is further disclosed an example, wherein the guest infrastructure comprises containerization infrastructure.

There is further disclosed an example, wherein the computing apparatus is a gateway.

What is claimed is:

1. A computer-implemented method of protecting a user from phishing attacks, comprising:
   detecting that the user has opened a website associated with a uniform resource locator (URL), and determining that the URL does not have a known good reputation, comprising querying a cloud-based reputation store for the URL;
   in response to the determining, rendering a test version of the website in a headless web browser, including abstracting the website into at least one visual element of the test version;
   visually inspecting the test version of the website with a digital eye, the digital eye comprising a machine learning model visually trained on known legitimate websites, and determining that the test version of the web looks like a known legitimate website not associated with the URL; and
   based on the visual inspection, warning the user that the website is or may be a phishing website.

2. The method of claim 1, further comprising querying a cloud reputation service to determine that the URL does not have a known good reputation.

3. The method of claim 1, further comprising querying a local reputation cache to determine that the URL does not have a known good reputation.

4. The method of claim 1, further comprising determining that the user has not previously visited the URL to determine that the URL does not have a known good reputation.

5. The method of claim 1, wherein abstracting the at least one visual element includes a corporate logo.

6. The method of claim 1, wherein abstracting the at least one visual element includes a font.

7. The method of claim 1, wherein abstracting the at least one visual element includes a background color.

8. The method of claim 1, wherein abstracting the at least one visual element includes a background pattern.

9. The method of claim 1, wherein abstracting the at least one visual element includes a color scheme.

10. The method of claim 1, wherein determining that the test version of the website looks like the known legitimate website not associated with the URL comprises determining that the URL is a non-secure hypertext transport protocol (HTTP) URL.

11. The method of claim 1, wherein determining that the test version of the website looks like the known legitimate website not associated with the URL comprises determining that the URL uses transport layer security (TLS), but that a certificate of the URL is not associated with the known legitimate website.

12. The method of claim 1, wherein determining that the test version of the website looks like the known legitimate website not associated with the URL comprises determining that the URL belongs to a blogs or personal webpages subdomain of a known third-party service not associated with the known legitimate website.

13. One or more tangible, nontransitory computer-readable storage media having stored thereon executable instructions to:
  detect that a user has opened a website associated with a uniform resource locator (URL), and determine that the URL does not have a known good reputation, comprising querying a cloud-based reputation store for the URL;
  in response to the determining, render a test version of the website in a headless web browser, including abstracting the website into at least one visual element of the test version;
  visually inspect the test version of the website with a digital eye, the digital eye comprising a machine learning model visually trained on known legitimate websites, and determine that the test version of the web looks like a known legitimate website not associated with the URL; and
  based on the visual inspection, warn the user that the website is or may be a phishing website.

14. The one or more tangible, nontransitory computer-readable storage media of claim 13, wherein the instructions are further to query a cloud reputation service to determine that the URL does not have a known good reputation.

15. The one or more tangible, nontransitory computer-readable storage media of claim 13, wherein the instructions are further to query a local reputation cache to determine that the URL does not have a known good reputation.

16. The one or more tangible, nontransitory computer-readable storage media of claim 13, wherein the instructions are further to determine that the user has not previously visited the URL to determine that the URL does not have a known good reputation.

17. A computing apparatus, comprising:
  a hardware platform comprising a processor circuit and a memory; and
  instructions encoded within the memory to instruct the processor circuit to:
    detect that a user has opened a website associated with a uniform resource locator (URL), and determine that the URL does not have a known good reputation, comprising querying a cloud-based reputation store for the URL;
    in response to the determining, render a test version of the website in a headless web browser, including abstracting the website into at least one visual element of the test version;
    visually inspect the test version of the website with a digital eye, the digital eye comprising a machine learning model visually trained on known legitimate websites, and determine that the test version of the web looks like a known legitimate website not associated with the URL; and
    based on the visual inspection, warn the user that the website is or may be a phishing website.

18. The computing apparatus of claim 17, wherein the instructions are further to query a cloud reputation service to determine that the URL does not have a known good reputation.

19. The computing apparatus of claim 17, wherein the instructions are further to query a local reputation cache to determine that the URL does not have a known good reputation.

20. The computing apparatus of claim 17, wherein the computing apparatus is a gateway.

* * * * *